(12) United States Patent
Ishigo et al.

(10) Patent No.: US 8,419,285 B2
(45) Date of Patent: Apr. 16, 2013

(54) SLIDING BEARING FOR INTERNAL COMBUSTION ENGINE AND SLIDING BEARING DEVICE

(75) Inventors: Osamu Ishigo, Inuyama (JP); Atsushi Okado, Inuyama (JP)

(73) Assignee: Daido Metal Company Ltd., Naka-Ku, Nagoya (JP)

( * ) Notice: Subject to any disclaimer, the term of this patent is extended or adjusted under 35 U.S.C. 154(b) by 771 days.

(21) Appl. No.: 12/616,945

(22) Filed: Nov. 12, 2009

(65) Prior Publication Data

US 2010/0119181 A1    May 13, 2010

(30) Foreign Application Priority Data

Nov. 12, 2008  (JP) ................................ 2008-289730

(51) Int. Cl.
- *F16C 9/02* (2006.01)
- *F16C 33/02* (2006.01)
- *F16C 35/00* (2006.01)

(52) U.S. Cl.
USPC ............ 384/294; 384/278; 384/429; 384/434

(58) Field of Classification Search .................. 384/288, 384/291, 294, 429, 430, 432–434
See application file for complete search history.

(56) References Cited

U.S. PATENT DOCUMENTS

| | | | |
|---|---|---|---|
| 5,788,380 A | 8/1998 | Niegel et al. | |
| 6,082,904 A * | 7/2000 | Ono et al. | 384/291 |
| 6,089,756 A * | 7/2000 | Ono et al. | 384/322 |
| 6,422,755 B1 * | 7/2002 | Cadle et al. | 384/433 |
| 6,695,482 B2 * | 2/2004 | Niwa et al. | 384/294 |
| 2005/0213859 A1 * | 9/2005 | Kuroda et al. | 384/291 |
| 2006/0231164 A1 * | 10/2006 | Ishida et al. | 148/206 |

FOREIGN PATENT DOCUMENTS

| | | |
|---|---|---|
| JP | 59-51211 U | 4/1984 |
| JP | 3-14314 U | 2/1991 |
| JP | 3-81549 A | 4/1991 |
| JP | 3-223517 | 10/1991 |
| JP | 8210355 | 8/1996 |
| JP | 9511050 | 11/1997 |
| JP | 10-30419 A | 2/1998 |
| JP | 2002-188624 A | 7/2002 |
| JP | 2010-508159 | 6/2012 |
| WO | 2008/052653 | 5/2008 |

* cited by examiner

*Primary Examiner* — Phillip A Johnson
(74) *Attorney, Agent, or Firm* — Browdy and Neimark, PLLC

(57) ABSTRACT

Disclosed is a sliding bearing consisting of a pair of semi-cylindrical bearings for supporting a crankshaft or a crank pin in an internal combustion engine. The sliding bearing is incorporated in a split-type bearing housing. One of the semi-cylindrical bearings being incorporated in at least one of the pair of housing halves, which one housing half has a relatively higher stiffness, is provided with a number of circumferential grooves on an inner surface of the semi-cylindrical bearing so as to extend circumferentially along the inner surface of the semi-cylindrical bearing. The circumferential grooves existing at least one circumferential end region of the inner surface of the semi-cylindrical bearing have a depth of not less than 10 μm, the circumferential end region including a circumferential bearing end face orientating a direction opposite to the rotation direction of the shaft or pin.

20 Claims, 5 Drawing Sheets

SLIDING BEARING FOR INTERNAL COMBUSTION ENGINE AND SLIDING BEARING DEVICE

CROSS-REFERENCE TO RELATED APPLICATIONS

The present application claims priority from JP Patent Application Ser. No. 2008-289730 filed on Nov. 12, 2008, the content of which is hereby incorporated by reference into this application.

TECHNICAL BACKGROUND OF THE INVENTION

The present invention relates to a sliding bearing consisting of a pair of semi-cylindrical bearings combined with each other so as to form a cylinder, for supporting a crankshaft or a crank pin in an internal combustion engine, the semi-cylindrical bearings being adapted to be incorporated in a split-type bearing housing having a cylindrical bearing retaining bore which is bi-split so as to correspond to the cylindrically combined semi-cylindrical bearings. (Refer to JP-A-08-210355 for example.)

RELATED ART

A sliding bearing for supporting a crank journal or a crank pin in an internal combustion engine has been used in the form of a cylindrical member consisting of a pair of combined semi-cylindrical bearings. Lubricant oil is forced to be fed between the sliding bearing and a shaft (i.e. a rotary shaft) to be supported.

In these years, there has been a tendency that components of the above-mentioned bearing housing are becoming to have lower stiffness under a situation of aiming at reducing the weight of internal combustion engines. When a bearing cap is fastened to a crankcase side housing or a connecting rod side housing by means of bolts after a pair of semi-cylindrical bearings are incorporated in the bearing housing, the elastic deformation of the bearing cap having a comparatively lower stiffness becomes larger than that of the crankcase side housing or the connecting rod side housing since they are different in stiffness from each other due to their different configurations. FIGS. 1 and 2 show the above mentioned conditions. Referring to FIG. 1, a bearing cap 02 is fastened to a connecting rod side housing 01 by means of bolts 03. Referring to FIG. 2, a bearing cap 05 is fastened to a crank side housing 04 by means of bolts 06.

Thus, in the case where the degrees of relative elastic deformation of the bearing caps 02, 05 are large as compared with the connecting rod side housing 01 and the crankcase side housing 04, relatively large stepped differences 07, 08 are liable to occur between the abutting end faces of the connecting rod side housing 01 and the bearing cap 02 and between the abutting end faces of the crankcase side housing 04 and the bearing cap 05, due to differences in inside diameters between the combined components. In the case where the stepped difference occurs as stated above, the sliding bearing consisting of a pair of semi-cylindrical bearings 09, 010 will be deformed, in association with the thus deformed shape of the bearing holding bore in the housing, and as a result, similar to the stepped difference in the housing, a stepped difference 011 will also occur between the abutting end faces of the pair of semi-cylindrical bearings 09, 010, due to a difference in inside diameter between both semi-cylindrical bearings (see FIG. 3).

Meanwhile, in order to reduce the weight of the internal combustion engine, as stated above, it has been intended to miniaturize an oil pump for lubricating an internal combustion engine, resulting in reduction of the quantity of oil to be fed, and accordingly, there has been used the configuration that a clearance between the sliding bearing and a shaft (crankpin or crank-journal) to be supported thereby, is reduced as possible as it can in order to decrease the amount of leakage of the oil from both widthwise ends of the sliding bearing. With this configuration, should the above-mentioned stepped difference 011 occur, the lubricant oil flowing along the inner surface of the sliding bearing will be prevented, and accordingly, there will be possibly cased the so-called wiping phenomenon that lubricant oil flowing in the same direction as the rotation direction 013 of the shaft 012 (crankpin shown in FIG. 3) to be supported is scraped up by the stepped difference 011. As a result, the quantity of leakage of the oil from both widthwise ends of the sliding bearing increases, and accordingly, the supply quantity of the lubricant oil onto the inner surface (that is, the sliding surface) of the sliding bearing becomes insufficient, resulting in damage to the bearing, such as abrasion or seizure.

JP-A-09-511050 discloses measures for preventing occurrence of the above-mentioned stepped difference between the abutting end faces of the sliding bearing. According to JP-A-09-511050, there is proposed a bearing device in which the inner diameter shape of the bearing cap is adjusted in view of the degree of elastic deformation of the bearing cap having lower stiffness, which deformation is larger than that of the associated bearing housing to be mated therewith when the split type bearing housing is fastened by bolts, in order to align the inner surfaces of both components at its abutting end faces with respect to those of the associated housing.

Even using the above-mentioned configuration, the dynamic load which is exerted on the split type bearing housing during operation of the internal combustion engine causes elastic deformations of the bearing cap and the associated housing, which are different from each other since the bearing cap and the associated housing have different stiffness from each other, and accordingly, occurrence of stepped difference between the abutting end faces of the sliding bearing, and the wiping phenomenon caused by the stepped difference cannot be avoided.

BRIEF SUMMARY OF THE INVENTION

Thus, an object of the present invention is to provide a sliding bearing consisting of a pair of semi-cylindrical bearings held in a split-type bearing housing, which is capable of preventing the so-called wiping phenomenon that lubricant oil flowing along the inner surface of the sliding bearing in the same direction as that of the rotation direction of a shaft to be supported (a crank pin or a crank journal) is scraped up by a stepped difference that is though caused between abutting end faces of the sliding bearing due to a difference in bore size between both semi-cylindrical bodies.

Under the object, according to a first aspect of the present invention, there is provided
a sliding bearing consisting of a pair of semi-cylindrical bearings for supporting a crankshaft or a crank pin in an internal combustion engine, the semi-cylindrical bearings being combined with each other so as to form a cylinder, and being adapted to be incorporated in a split-type bearing housing having a cylindrical bearing retaining bore which is bi-split so as to correspond to the cylindrically combined semi-cylindrical bearings, the split-type bearing housing consisting of a pair of housing halves being different in stiffness from each other, wherein one of the semi-cylindrical bearings being incorporated in at least one of the pair of housing halves, which one housing half has a relatively higher stiffness, is provided with a number of circumferential grooves on an inner surface of the semi-cylindrical bearing so as to extend circumferentially along the inner surface of the semi-cylindrical bearing, and wherein the circumferential grooves existing at least one circumferential end region of the inner surface of the semi-cylindrical bearing, the circumferential end region including a circumferential bearing end face orientating a direction opposite to the rotation direction of the crankshaft or the crankpin, have a depth of not less than 10 µm.

It is noted here that a size of a stepped difference, which is liable to occur in the split type bearing housing in the internal combustion engine, is, in general, about 10 µm at most, and accordingly, in view of this fact, the depth of the circumferential grooves is set to be not less than 10 µm, since if the depth of the grooves is not less than 10 µm, the lubricant oil flowing along the inner surface of the sliding bearing can not be prevented by the end surface of the semi-cylindrical bearing which makes the stepped difference.

According to a second aspect of the present invention, there is provided a sliding bearing device in an internal combustion engine, comprising:

a sliding bearing consisting of a pair of semi-cylindrical bearings for supporting a crankshaft or a crank pin in the internal combustion engine, the semi-cylindrical bearings being combined with each other so as to form a cylinder, and a split-type bearing housing having a cylindrical bearing retaining bore which is bi-split so as to correspond to the cylindrically combined semi-cylindrical bearings, and containing the pair of semi-cylindrical bearings in the bearing retaining bore, wherein the split-type bearing housing consists of a pair of housing halves being different in stiffness from each other, wherein one of the semi-cylindrical bearings being incorporated in at least one of the pair of housing halves, which housing half has a relatively higher stiffness, is provided with a number of circumferential grooves on an inner surface of the semi-cylindrical bearing so as to extend circumferentially along the inner surface of the semi-cylindrical bearing, and wherein the circumferential grooves, existing at least one circumferential end region of the inner surface of the semi-cylindrical bearing, have a depth of not less than 10 µm, the circumferential end region including a circumferential bearing end face orientating a direction opposite to the rotation direction of the crankshaft or the crankpin.

In a first embodiment of the present invention, the circumferential end region of the inner surface is defined by a circumferential length range corresponding to a circumferential angle of at least 10°, but 50° at maximum. The extent of the circumferential angle corresponds to a partial region of the inner surface (i.e. the sliding surface) of the sliding bearing, excluding a main load bearing part thereof.

In a second embodiment of the present invention, a residual region of the inner surface of the semi-cylindrical bearing other than the region of the circumferential length range has a surface roughness of not more than 3.2 µmRz.

In a third embodiment of the present invention, the circumferential grooves have a pitch of 0.5 to 1.5 mm.

In a fourth embodiment of the present invention, the bottoms of the circumferential grooves formed on the inner surface of the semi-cylindrical bearing incorporated in the housing half having a relatively higher stiffness, and an inner surface of the other one of the semi-cylindrical bearing incorporated in the other housing half, the inner surface, as a sliding surface, being brought into sliding contact with the crankshaft or the crank pin to be supported, have a positional relationship such that the bottoms of the circumferential grooves and the inner surface of the other one of the semi-cylindrical bearing are aligned with each other at abutting end faces of the pair of semi-cylindrical bearings.

In a fifth embodiment of the present invention, the other semi-cylindrical bearing incorporated in the other housing half is also provided with a number of circumferential grooves on an inner surface of the other semi-cylindrical bearing so as to extend circumferentially along the inner surface of the other semi-cylindrical bearing, and the circumferential grooves, existing at least one circumferential end region of the inner surface of the other semi-cylindrical bearing, have a depth of not less than 10 µm, the circumferential end region including a circumferential bearing end face existing at an opposite side to the rotation direction of the crankshaft or the crankpin.

In a sixth embodiment of the present invention, the circumferential end region of the inner surface of the other semi-cylindrical bearing incorporated in the other housing half is defined by a circumferential length range corresponding to a circumferential angle of at least 10°, but 50° at maximum, which is measured from the circumferential end face as a starting point.

In a seventh embodiment of the present invention, a residual region of the inner surface of the other semi-cylindrical bearing other than the region of the circumferential length range has a surface roughness of not more than 3.2 µmRz.

In an eighth embodiment of the present invention, the circumferential grooves formed in the semi-cylindrical bearing incorporated in the other housing half have a pitch of 0.5 to 1.5 mm.

In an ninth embodiment of the present invention, the thicknesses of the pair of semi-cylindrical bearings are adjusted in the circumferential end regions, thereby the inner surface of the semi-cylindrical bearing incorporated in the housing half having a relatively higher stiffness and the inner surface of the other semi-cylindrical bearing body incorporated in the other housing half are aligned with each other at those abutting end faces. According to such configuration, a prevention effect of occurrence of the wiping phenomenon is enhanced, so that even if the stepped difference variable under dynamic load is large, a relationship between the pair of semi-cylindrical bearings can hardly become a barrier against lubricant oil flowing in the circumferential grooves.

Advantages of the present invention are as follows:

(1) The one of the pair of bearing-housing halves constituting the split type bearing housing, which has a relatively lower stiffness, suffers a large degree of deformation in the assembled condition in comparison with the mating housing half having a relatively higher stiffness, so that the semi-cylindrical bearing incorporated in the housing half having the relatively lower stiffness suffers a relatively large degree of elastic deformation in comparison with the mating semi-cylindrical bearing incorporated in the housing half having the relatively higher stiffness. Thus, the inner diameters of both semi-cylindrical bearings at those circumferential end faces (i.e. those abutting end faces) are different from each other, so that the abutting end faces of the semi-cylindrical bearing incorporated in the housing half having the relatively higher stiffness project inwardly (i.e. toward the center axis of the sliding bearing) relative to the abutting end faces of the other semi-cylindrical bearing incorporated in the other housing half having a relatively lower stiffness. This deviated state of the abutting end faces can be comprehended as a stepped difference, since the semi-cylindrical bearing which is incorporated in the housing half having the relatively higher stiffness projects its abutting end faces on the inner surface (sliding surface) side of the sliding bearing. In a conventional sliding bearing, the stepped difference have set off an oil scraping phenomenon (i.e. the wiping phenomenon). However, according to the present invention, since the one of the semi-cylindrical bearings which is incorporated at least in the bearing housing half having relatively higher stiffness is provided with a number of circumferential grooves on its inner surface, and since the circumferential grooves formed in an circumferential end region including at least one of two circumferential end faces of the semi-cylindrical bearing, which faces in a direction opposite to the rotation direction of the shaft to be supported, have a depth of not less than 10 μm, the lubricant oil smoothly flows along the inner surface of the sliding bearing in the rotation direction of the shaft to be supported while being guided by the circumferential grooves having a depth of not less than 10 μm without interruption by the stepped difference. Thus, it is possible to reduce an amount of the lubricant oil flowing, toward the widthwise direction of the sliding bearing, along the stepped difference in the abutting end faces of the semi-cylindrical bearings, thereby enabling an effective prevention of occurrence of damages of the sliding bearing, such as wear, seizure and so on due to an insufficient supply amount of the lubricant oil.

(2) According to a first and a second embodiments of the present invention, an extent of the circumferential grooves, having a depth of not less than 10 μm and existing at least one circumferential end region of the inner surface of the semi-cylindrical bearing, is set to be an circumferential angle range of at least 10°, but 50 at maximum, which is measured from the circumferential end face as a starting point, and a residual region of the inner surface of the semi-cylindrical bearing other than the region of the circumferential angle range is formed to have a usual surface roughness of not more than 3.2 μmRz, thereby keeping a formation of an oil film in a main load bearing region of the semi-cylindrical bearing as usual.

(3) According to a third embodiment of the present invention, while ridges of the circumferential grooves serve as barriers against an oil leakage in the widthwise direction of the sliding bearing, since each of the ridges has a large cross-sectional area around those crests by making the pitch of the circumferential grooves to be not less than 0.5 mm, the ridges can have a higher strength and accordingly can hardly cause plastic deformation even though they are in contact with a mating shaft, and can hardly be worn. Thus, the clearance between the crests and the mating shaft to be supported can be prevented from being increased, thereby it is possible to prevent the quantity of leakage of the lubricant oil widthwise of the sliding bearing from being increased. On the other hand, if the pitch of the circumferential grooves is less than 0.5 mm, since the ridges have smaller cross-sectional areas around those crests, the ridges have a lower strength, and accordingly, they readily cause plastic deformation and are quickly worn when they are in contact with the associated shaft. Further, if the pitch of the circumferential grooves exceeds the upper limit of 1.5 mm, the number of the ridges becomes excessively small, and accordingly, a surface contact pressure between the ridges and the mating shaft at the crests becomes higher resulting in an increased wear amount.

(4) According to a fourth embodiment of the present invention, the bottoms of the circumferential grooves formed on the inner surface of the semi-cylindrical bearing incorporated in the one housing half, and an inner surface of the other semi-cylindrical bearing incorporated in the other housing half being brought into sliding contact with the crankshaft or the crank pin to be supported, have a positional relationship such that the bottoms of the circumferential grooves and the inner surface of the other one of the semi-cylindrical bearing are aligned with each other at abutting end faces of the pair of semi-cylindrical bearings. According to such a configuration in which, the circumferential grooves having a depth of not less than 10 μm are formed only in the inner surface of the semi-cylindrical bearing incorporated in the one housing half while the inner surface of the other semi-cylindrical bearing incorporated in the other housing half has a usual surface roughness (e.g. below 3.2 μmRz), even though one of the circumferential end faces of the former semi-cylindrical bearing is protruded in a step-like manner, such a protrusion of the circumferential end face of the former semi-cylindrical bearing does not interrupt a flow of the lubricant oil flowing from the latter semi-cylindrical bearing to the former semi-cylindrical bearing.

(5) According to the fifth embodiment of the present invention, the other semi-cylindrical bearing incorporated in the other housing half is also provided with a number of circumferential grooves on an inner surface of the other semi-cylindrical bearing so as to extend circumferentially along the inner surface of the other semi-cylindrical bearing, and the circumferential grooves, existing at least one circumferential end region of the inner surface of the other semi-cylindrical bearing, have a depth of not less than 10 μm, the circumferential end region including a circumferential bearing end face existing at an opposite side to the rotation direction of the mating shaft. When there arose a large degree of elastic deformation, in the direction that its inner diameter is decreased (i.e. close-in), at the abutting end faces of the hosing half having a lower stiffness under receiving a dynamic load, in the case where a pair of the semi-cylindrical bearings, which constitute the sliding bearing, are provided with the circumferential grooves on those inner surfaces, even if stepped differences occurred at the circumferential end faces of the pair of the semi-cylindrical bearings due to the elastic deformation of the housing half, the stepped differences hardly interrupt a flow of the lubricant oil flowing in the circumferential grooves of the semi-cylindrical bearings.

(6) In the fifth to ninth embodiments of the present invention, the thickness of the pair of semi-cylindrical bearings is adjusted in those circumferential end regions so that the inner surface of the semi-cylindrical bearing incorporated in the one housing half is aligned with the inner surface of the other semi-cylindrical bearing incorporated in the other housing half, at those abutting end faces. According to such a configuration, the effect of preventing occurrence of the wiping phenomenon is enhanced, and such an effect is obtainable even if large stepped differences occurred due to a dynamic load thereby enabling the pair of combined semi-cylindrical bearings not to interrupt a flow of the lubricant oil in the circumferential grooves.

Other objects, features and advantages of the invention will become apparent from the following description of the embodiments of the invention taken in conjunction with the accompanying drawings.

BRIEF DESCRIPTION OF THE SEVERAL VIEWS OF THE DRAWINGS

FIGS. 5A and 5B show circumferential end faces of a semi-cylindrical bearing as viewed in the direction of the arrow B shown in FIG. 4, wherein FIGS. 5A and 5B illustrates, respectively, different pitches of the circumferential grooves from each other;

DETAILED DESCRIPTION OF THE INVENTION

Hereinbelow there will be provided a detailed explanation of embodiments of the present invention and comparative examples with reference to the accompanying drawings of FIGS. 4 to 9.

Figure 1:
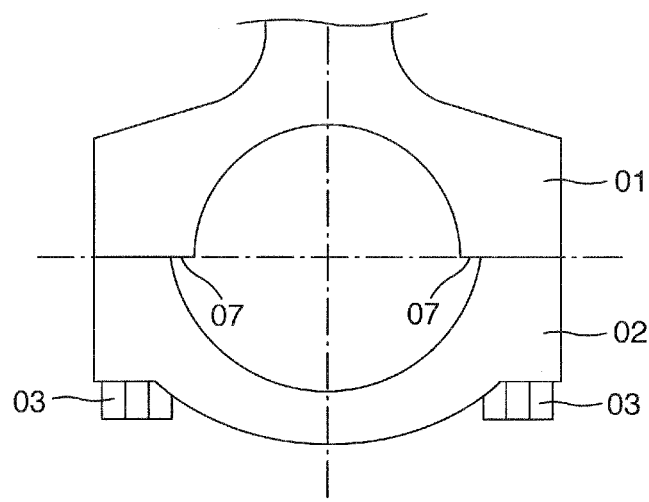
FIG. 1 is a front view illustrating a big end part of a connecting rod assembled thereto with a bearing cap in a conventional configuration.
Figure 2:
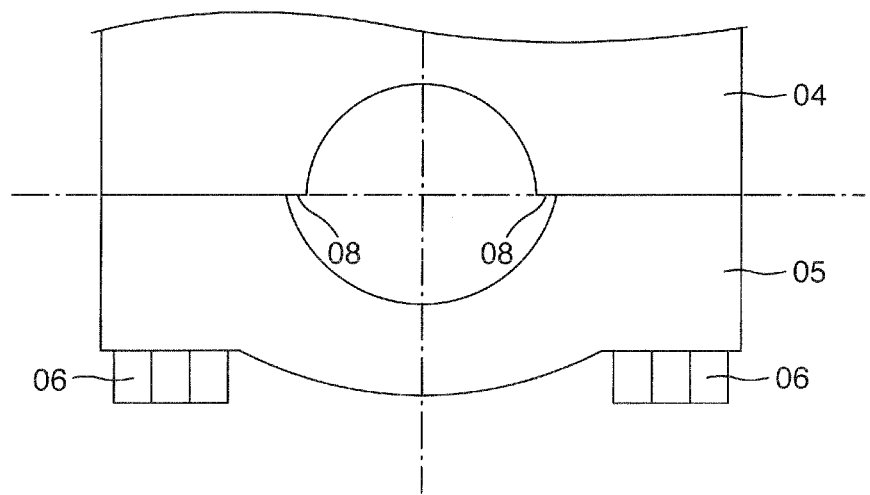
FIG. 2 is a front view illustrating a part of a crankcase assembled with a bearing cap in a conventional configuration.
Figure 3:
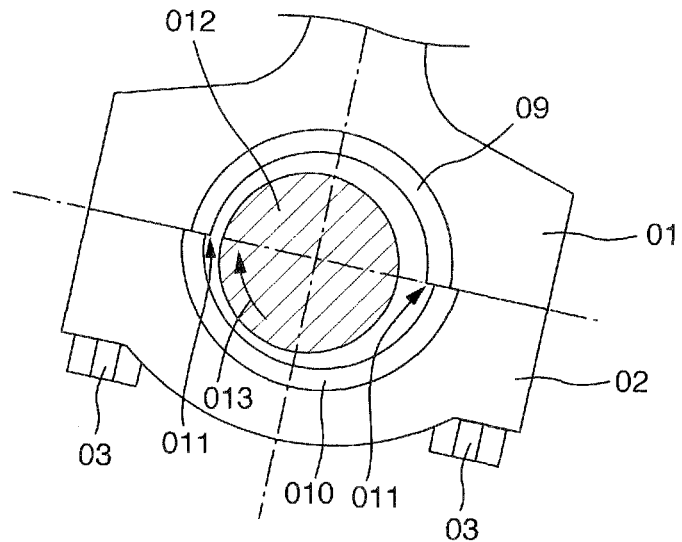
FIG. 3 is a front view illustrating a bearing housing composed of a big end part of a connecting rod and a bearing cap, a connecting rod bearing held in the bearing housing, and a crank pin.
Figure 4:
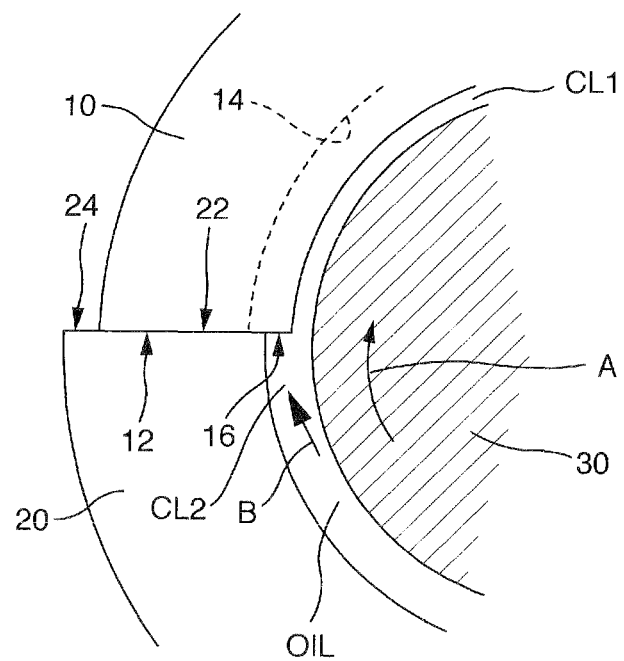
FIG. 4 is a view illustrating, in part, a split-type sliding bearing as one embodiment of the present invention, and a mating shaft (i.e. a rotary shaft) which is supported by the sliding bearing.

FIG. 4 is a view which shows a part of a sliding bearing consisting of a pair of semi-cylindrical bearings 10, 20, and which is a cross-sectional view in a plane crossing the center axis of a mating shaft to be supported. In a bearing housing which is shown in FIG. 1 or 2, the sliding bearing is held in the manner shown in FIG. 3. Referring to FIG. 4, the mating shaft to be supported (i.e. a crank pin or a crank journal) which is adapted to be rotated in the direction of the arrow A is held by semi-cylindrical bearings 10, 20. The shaft to be supported and the semi-cylindrical bearings define therebetween clearances CL1 and CL2 into which lubricant oil (OIL) is fed under pressure to flow in the direction B which is the same as the direction of the arrow A.

Figure 5A:
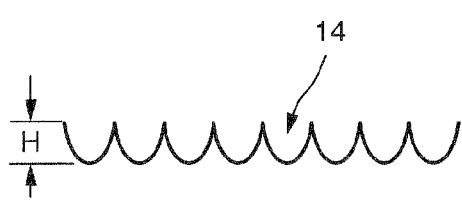
Figure 5B:
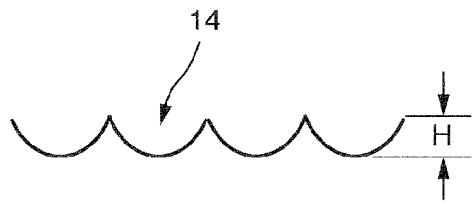

The semi-cylindrical bearing 10 incorporated in one of housing halves of a split type housing, which has a relatively higher stiffness, is formed on its inner surface with a number of circumferential grooves 14 having a depth of not less than 10 μm in a circumferential end region of the semi-cylindrical bearing. The circumferential grooves 14 are formed as shown in FIGS. 5A and 5B, as viewed from the circumferential end face 12 side of the semi-cylindrical bearing 10. The circumferential grooves shown in FIGS. 5A and 5B have an identical depth H to each other, but have different pitches from each other (the technical effects and advantages which can be exhibited by the difference in pitches have been already explained in Item (3) of the "Advantages of the present invention"). The circumferential grooves 14 are preferably formed by an extent of a circumferential length which corresponds to a circumferential angle of at least 10° but 50° at maximum, measured from the circumferential end face 12 of the semi-cylindrical bearing 10 as a starting point (see the angle α in FIG. 8).

Although it is not indispensable, the circumferential grooves 14 may be also formed by an extent of a circumferential length corresponding to a circumferential angle of at least 10° but 50° at maximum, measured from the other circumferential end face (not shown) as a starting point. A residual region of the inner surface of the semi-cylindrical bearing 10 other than the region of the circumferential grooves 14 has a usual surface roughness of not more than 3.2 μmRz.

When a pair of housing halves of the split type housing are combined with utilization of fastening bolts while incorporating the semi-cylindrical bearings 10, 20 therein such that the semi-cylindrical bearing 20 is held by one of the housing halves, which one has a relatively lower stiffness than the other, the semi-cylindrical bearing 20 is largely deformed and deviated outwardly at its circumferential end faces 22 as compared with the semi-cylindrical bearing 10, thereby there arises an outwardly stepped difference portion 24 at the circumferential end face 22 while arising an inwardly stepped difference portion 16 at the circumferential end face 12 of the semi-cylindrical bearing 10. In a region where the inwardly stepped difference portion 16 arose, the mating shaft 30 and the semi-cylindrical bearing 20 define therebetween a clearance CL2 which is larger than the clearance CL1 defined between the mating shaft 30 and the semi-cylindrical bearing 10.

Figure 6:
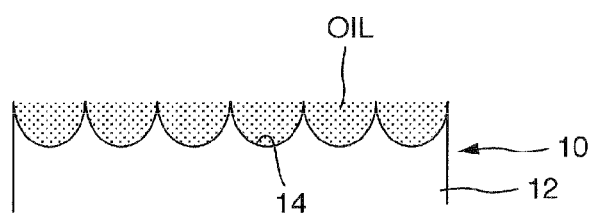
FIG. 6 is a view which is similar to FIGS. 5A and 5B, while showing also lubricant oil flowing in the circumferential grooves.
Figure 7:
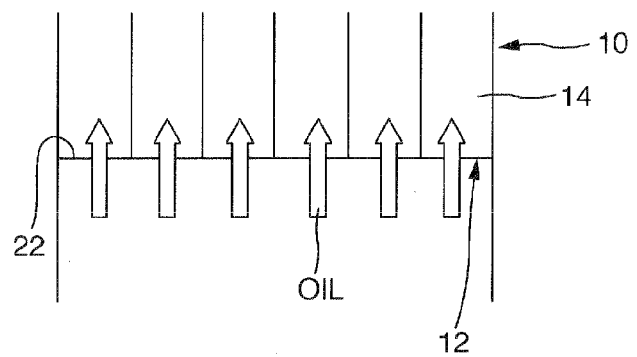
FIG. 7 is a view illustrating a region (i.e. a region of abutting end faces of a pair of semi-cylindrical bearings) in FIG. 4, where a stepped difference occurred, as viewed from the inner surface side of the sliding bearing.

The lubricant oil flowing through the clearance CL2 in the direction of the arrow B is led into the circumferential grooves 14 without interruption even by the inwardly stepped difference portion 16 which is a part of the circumferential end face 12 of the semi-cylindrical bearing 10, so as to flow smoothly along the inner surface of the semi-cylindrical bearing 16 as shown in FIGS. 6 and 7. The depth H of the circumferential grooves, which is set to be not less than 10, is capable of accommodating deformation which is cased in both split-type bearing for a crank pin and split type bearing for a crank journal during assembly of the bearing and as well capable of accommodating dynamic deformation during operation of an internal combustion engine, and further, the inner surface (i.e. the sliding surface) of the semi-cylindrical bearing 20 is at a level which is higher (rightward as views in FIG. 4) than the bottoms of the circumferential grooves 14. With this configuration, the lubricant oil (OIL) which comes to the circumferential end face 12 of the semi-cylindrical bearing 10 after flowing through the relatively large clearance CL2 can be led into the circumferential grooves 14 with success. Thus, the quantity of the lubricant oil (OIL) which spills out from both widthwise ends of the semi-cylindrical bearing 20 can be sufficiently reduced.

As in a conventional sliding bearing, should no a number of circumferential grooves 14 having a relatively large depth H be present in the circumferential end face region of the inner surface of the semi-cylindrical bearing 10, the lubricant oil (OIL) which has come to the circumferential end face of the semi-cylindrical bearing after flowing through the clearance CL2, would be blocked by the circumferential end face and accordingly, would flow in the direction widthwise of the bearing (normal to the sheet surface of FIG. 4) along the circumferential end face of the semi-cylindrical bearing, being promoted by the fact that the clearance CL2 is larger than the clearance CL1, and as a result, a large quantity of lubricant oil would spill out from both widthwise ends of the sliding bearing.

Of four circumferential end regions of the inner surfaces of the semi-cylindrical bearings 10, 20, which one is appropriate for forming the circumferential grooves having a relatively large depth H will be considered hereinbelow: The elastic deformation as shown in FIG. 4, that is, both circumferential ends of the semi-cylindrical bearing 20 which is held in the housing half having a lower degree of stiffness are outwardly deviated and deformed so as to be expanded with respect to the semi-cylindrical bearing 10, is typical among deformations (static deformations) of a split type sliding bearing assembled in a bearing housing within an internal combustion engine. With this deformation, as shown in FIG. 4, it is sufficient if the circumferential grooves 14 are formed in the circumferential end region of the semi-cylindrical bearing 10 including the one of both circumferential end faces of the semi-cylindrical bearing 12 which faces in the direction opposite to the rotation direction A of the shaft. However, during operation of the internal combustion engine, there would be caused the deformation that the circumferential end face 22 of the semi-cylindrical bearing 20 held in the housing half having a lower degree of stiffness, is deviated and deformed inward (that is, toward the shaft to be supported) from the circumferential end face 12 of the semi-cylindrical bearing 10 (close-in), due to dynamic deformation. Further, there would be caused deviation of the abutting end faces of the split-type bearing housing fastened by bolts, and positional deviation of the abutting surface due to manufacturing errors during manufacture of the sliding bearing and the bearing housing. Thus, even in the condition that the split-type sliding bearing is assembled in the bearing housing (static condition), the condition shown in FIG. 4 cannot be always ensured, depending upon an assembled condition of the split-type bearing housing. Thus, it would be appropriate to form a number of circumferential grooves having a relatively large depth in all circumferential end regions of the semi-cylindrical bearings 10, 20 as shown in FIG. 8.

Figure 8:
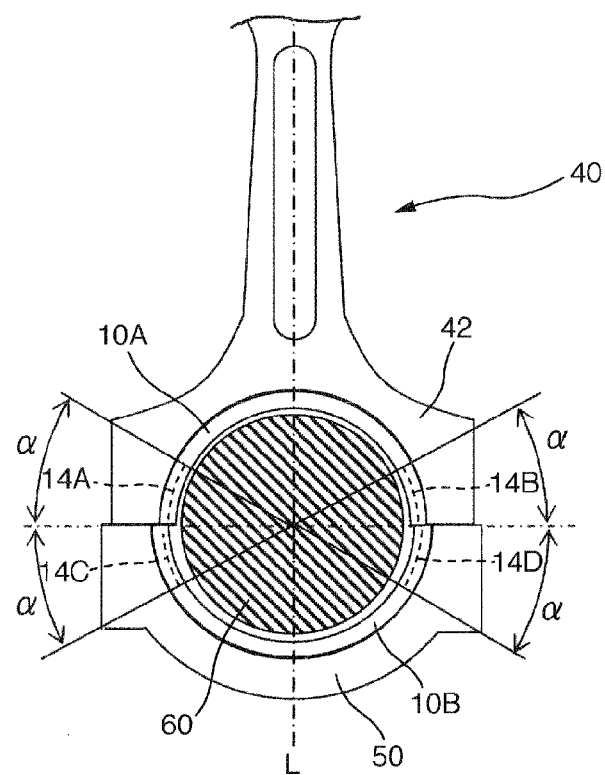
FIG. 8 is a view illustrating a bearing housing composed of a big end part of a connecting rod and a bearing cap, a connecting rod bearing, and a crank pin which are held in the bearing housing, in another embodiment of the present invention.

Referring to FIG. 8 which shows the condition that a connecting rod 40 is coupled to a crank pin 60 in an internal combustion engine, a big end part 42 of the connecting rod 40 and a bearing cap 50 which is fastened to the big end part 42 by bolts, constitute a split-type bearing housing, and a sliding bearing is held in a bearing retaining bore in the split-type bearing housing while a crank pin 60 is extended through the bearing retaining bore and the sliding bearing. The split-type sliding bearing is comprised of a pair of semi-cylindrical bearings 10A, 10B. Circumferential grooves 14A, 14B, 14C 14D are formed in all circumferential end regions the inner surfaces of the semi-cylindrical bearings 10A, 10B in a manner similar to that of the a number of circumferential grooves 14 shown in FIG. 4. The extent of each of the regions in which the circumferential grooves are formed has a circumferential length corresponding to a circumferential angle α measured from each of the circumferential end faces of the semi-cylindrical bearings 10A, 10B, along the inner surface of the bearing. The circumferential angle α is determined with exception of the center regions of the semi-cylindrical bearings 10A, 10B, which are main load bearing parts of the semi-cylindrical bearings 10A, 10B, and which are defined by the center axis L of the connecting rod 10, and is appropriately set as α=10 to 50°. It is not always necessary to set the circumferential angles formed in the circumferential end regions to be equal to one another although all circumferential angles are set to an equal angle α as shown in FIG. 8.

The cross-sectional shape of the circumferential grooves may not only be an arc shape as shown in FIGS. 5A and 5B, but also a V-shape. In a method of forming the circumferential grooves, a cutting tool having a V-shape or arcuate tip may be used when lathe turning working to transfer the tip shape into the circumferential end region of the inner surface of the bearing.

In the case of the circumferential grooves having a V-shape cross-sectional shape, not less than about 50% of the area of the stepped difference which is caused between the abutting end faces of the semi-cylindrical bearings is occupied by the recessed parts of the circumferential grooves (that is, in other words, in view of the wall thickness of the stepped difference part, this value is equal to the reduction of the wall thickness thereof by not less than ½ with respect to the inner surface as a reference), thereby it is possible to sufficiently ensure the passage area for the lubricant oil.

In the case of the circumferential grooves having an arcuate cross-sectional shape, about ⅔ of the area of the stepped difference which is caused between the abutting end faces of the semi-cylindrical bearings is occupied by the recessed parts of the circumferential grooves (that is, in other words, in view of the wall thickness of the stepped difference, this value is equal to the reduction of the wall thickness by ⅔, with respect to the inner surface as a reference). Thus, it is possible to sufficiently ensure the passage area for the lubricant oil.

Further, the semi-cylindrical bearings of the sliding bearing according to the present invention may be subjected to thickness deviation in order to allow the thickness of the semi-cylindrical bearing is thinned from the circumferential center part of the semi-cylindrical bearing toward the circumferential end faces, as in the conventional ones. Alternatively, a crush relief or chamfering may be formed in the circumferential end regions of the semi-cylindrical bearings on the inner surface side.

Invention Examples 1 to 4

(1) Invention Example 1

The circumferential grooves, having a depth of not less than 10 μm and a pitch of 0.5 to 1.5 mm, are formed throughout on the inner surface of a semi-circular bearing which is held on the big end part of a connecting rod. However, no circumferential grooves are formed on the inner surface of a semi-circular bearing which is held in a bearing cap. When the bearing cap is assembled to the big end part of the connecting rod by fastening bolts after the pair of semi-cylindrical bearings are combined with each other, the inner surface of the semi-cylindrical bearing held by the bearing cap is expanded outwardly in the circumferential end regions thereof as shown in FIGS. 4 and 8.

(2) Invention Example 2

The circumferential grooves having a depth of not less than 10 μm and a pitch of 0.5 to 1.5 mm are formed in the inner surface of a semi-cylindrical bearing which is held in the big end part of the connecting rod, in both circumferential end regions having an extent of a circumferential length corresponding to a circumferential angle α=10 to 50°. On the other hand, the surface roughness of not more than 3.2 μmRz is provided on the inner surface (i.e. a main load bearing region) except for the both circumferential end regions. No circumferential grooves are formed on the inner surface of a semi-cylindrical bearing held in a bearing cap. When the bearing cap is combined to the big end part of the connecting rod by means of fastening bolts after the pair of semi-cylindrical bearings are combined with each other, the circumferential end regions of the inner surface of the semi-cylindrical bearing held by the bearing cap is expanded outwardly in the circumferential end regions thereof as shown in FIGS. 4 and 8.

(3) Invention Example 3

The circumferential grooves having a depth of not less than 10 μm and a pitch of 0.5 to 1.5 mm are formed throughout on the inner surface of a semi-cylindrical bearing which is held in the big end part of a connecting rod. However, no circumferential grooves are formed in the inner surface of the other semi-cylindrical bearing which is held by a bearing cap. When the bearing cap is combined to the big end part of the connecting rod by means of fastening bolts after the pair of semi-cylindrical bearings are assembled with each other, the circumferential end regions of the inner surface of the semi-cylindrical bearing held by the bearing cap is expanded outwardly in the circumferential end regions thereof, as shown in FIGS. 4 and 8.

(4) Invention Example 4

The circumferential grooves having a depth of not less than 10 μm and a pitch of 0.5 to 1.5 mm are formed throughout on the inner surface of a semi-circular bearing body which is held in the big end part of a connecting rod. Further, the circumferential grooves having a depth of not less than 10 μm and a pitch of 0.5 to 1.5 mm are formed throughout on the inner surface of a semi-cylindrical bearing held in a bearing cap. The wall thickness of both circumferential end parts of the inner surface of the semi-cylindrical bearing held in the bearing cap is set to be larger than that of the usual one, and accordingly, the inner diameter parts of the pair of semi-cylindrical bearings are aligned with each other in the static condition that the bearing cap is combined to the big end part of a connecting rod by fastening bolts. When the bearing cap is combined with the big end part of the connecting rod by fastening bolts after the pair of semi-cylindrical bearings is assembled with each other, the circumferential end regions of the inner surface of the semi-cylindrical bearing held in the bearing cap is expanded outwardly within the circumferential end regions of the inner surface, as shown in FIGS. 4 and 8.

(5) Comparative Example

No circumferential grooves are formed either in the semi-cylindrical bearing held on the big end part of a connecting rod, and also the semi-cylindrical bearing held in a bearing cap. When the bearing cap is combined with the big end part of the connecting rod by means of fastening bolts after the pair of semi-cylindrical bearings are incorporated therein, the circumferential end regions of the inner surface of the semi-cylindrical bearing held in the bearing cap is outwardly expanded as shown in FIGS. 4 and 8.

Comparison of the Invention Examples with the Comparative Example

As the comparative example, since the circumferential end regions of the inner surface of the semi-cylindrical bearing held in the bearing cap is expanded outwardly as shown in FIGS. 4 and 8 when the bearing cap is assembled on the big end part of the connecting rod by fastening bolts after the pair of semi-cylindrical bearings are combined with each other, a stepped difference occur between the abutting end faces of this semi-cylindrical bearing and the semi-cylindrical bearing held on the big end part of the connecting rod. Thus, the circumferential end faces of the semi-cylindrical bearing held on the big end part of the connecting rod having a relatively higher stiffness interrupts the lubricant oil from flowing circumferentially, resulting in occurrence of the wiping phenomenon. As a result, a leakage amount of the lubricant oil increases, thereby causing an insufficient supply of lubricant oil onto the sliding surface of the sliding bearing.

Regarding the invention example 1, since the circumferential grooves having a depth of not less than 10 μm, and a pitch of 0.5 to 1.5 mm are formed on the inner surface of the semi-cylindrical bearing held on the big end part of the connecting rod having a relatively higher stiffness, in the circumferential end regions thereof, the circumferential end faces of the semi-cylindrical bearing held on the big end part of the connecting rod having a relatively higher stiffness does not interrupt the lubricant oil from flowing in the circumferential grooves, so that no wiping phenomenon occurs.

Regarding the invention example 2, since the circumferential grooves having a depth of not less than 10 μm and a pitch of 0.5 to 1.5 mm are formed on the inner surface of the semi-cylindrical bearing held in the big end part of the connecting rod having a relatively high degree of stiffness within the circumferential end regions thereof, it is possible to prevent occurrence of the wiping phenomenon as to the lubricant oil. Further, since the surface roughness having not greater than 3.2 μmRz is applied over the inner surface except the circumferential end regions thereof, (that is, over the main load bearing part), an oil film can be readily formed on the sliding surface of the main load bearing region, so that the load capability of the sliding bearing is satisfactory.

Regarding the invention example 3, even though the stepped difference is repeatedly increased and decreased due to the close-in phenomenon that the inner diameter in a direction along the abutting end faces of the semi-cylindrical bearing held in the bearing cap decreases due to reciprocating inertia forces caused by exertion of dynamic load during the operation of an internal combustion engine, the circumferential end faces of the pair of semi-cylindrical bearings do not interrupt the lubricant oil from flowing thereby enabling prevention of occurrence of wiping.

Regarding the invention example 4, the wall thickness of the circumferential end parts of the inner surface of the semi-cylindrical bearing held in the bearing cap having a relatively lower stiffness is set to be larger than the usual one so as to align the inner diameter parts of the pair of semi-cylindrical bearings at the abutting end faces thereof with each other, the effect of preventing occurrence of wiping can be enhanced. Further, since the clearance between the inner surface of the bearing and the crank pin can be decreased, the amount of leakage of lubricant oil can be reduced.

Figure 9:
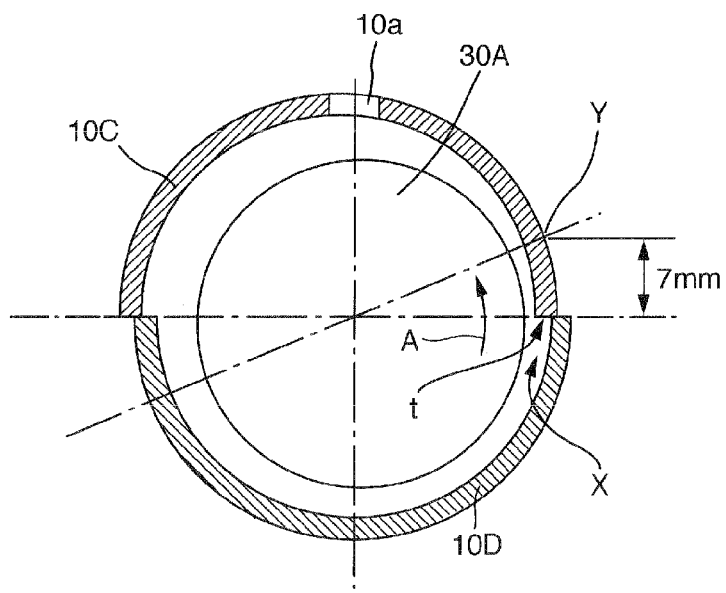
FIG. 9 is a view illustrating an invention specimen connecting rod bearing as a split-type sliding bearing, and a crank pin.

Tests for Confirming Effect of Wiping Restraint (1) Tests were carried out with the combination of a pair of semi-cylindrical bearings 10C, 10D in the configuration which is shown in FIG. 9, using test samples shown in Table 2. It is noted that the extent by which the circumferential grooves in the embodiment 1 and the embodiment 2 had a circumferential length corresponding to a circumferential angle of α=45°. A shaft 30A for testing was supported by the semi-cylindrical bearings 10C, 10D, and lubricant oil was fed between the shaft 30A for testing and the semi-cylindrical bearings 10C, 10D constituting the sliding bearing through an oil supply port 10a formed at a position in the circumferentially intermediate part of the semi-cylindrical bearing 10C. Temperatures were measured at a position Y which was nearer to a position X where the wiping phenomenon could possibly occur, as viewed in the rotation direction of the shaft 30A for testing when the shaft 30A are rotated in a direction as indicated by the arrow A. The position Y was distant from the circumferential end face of the semi-cylindrical bearing as a stating point, by a height of 7 mm along the outer peripheral surface of the semi-cylindrical bearing 10D (the vertical height position shown in FIG. 9).

(2) Test Method: The tests were carried out under testing conditions shown in Table 1, with the use of a dynamic load (rotational load) bearing testing machine. The specifications of test components 1 to 3 of the present invention, and the test component for comparison are shown in Table 2.

At first, in the condition that the circumferential end faces of the pair of semi-cylindrical bearings were made to abut against each other, the semi-cylindrical bearings 10C, 10D were tested with no positional shift (stepped difference) between the semi-cylindrical bearings 10C, 10D being present in the abutting parts thereof, and temperatures were measured at the position Y. Then, as shown in FIG. 9, the circumferential end faces of the pair of semi-cylindrical bearings 10C, 10D were made to abut against each other, and the semi-cylindrical bearings were tested in the condition that the positional shift (stepped difference) occurred in the abutting parts thereof, and temperatures were measured at the position Y. Variation in the lubricated condition caused by occurrence of a wiping effect could be checked by difference between the measured temperatures.

Figure 10:
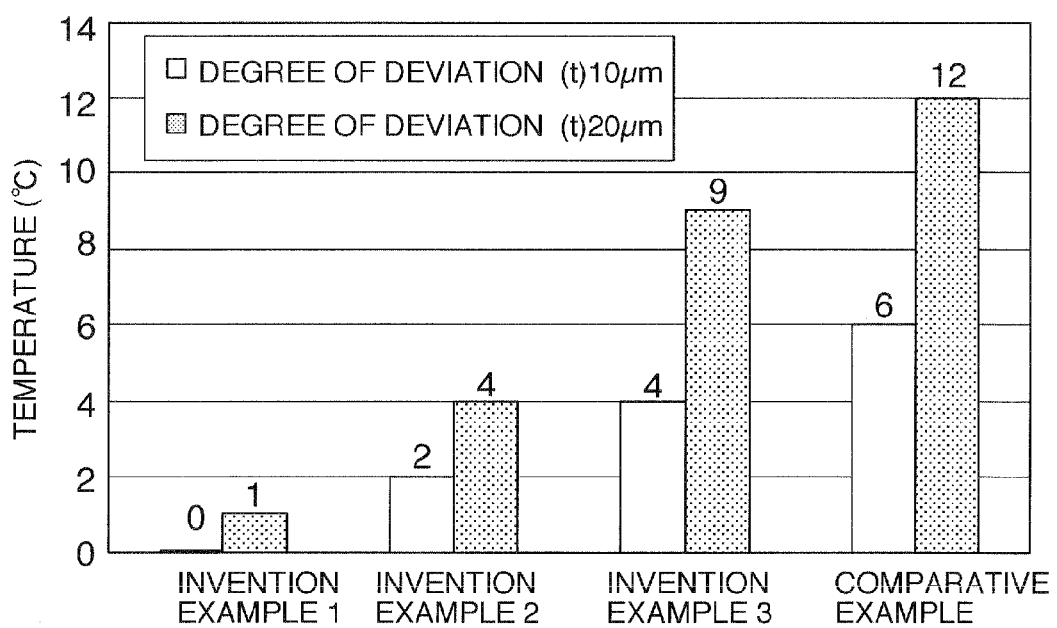
FIG. 10 is a graph showing temperature variation (i.e. temperature rise) before and after tests for confirming effects of wiping restraint, which were carried out for the invention specimens, and a comparative specimen.

The test results are shown in FIG. 10. The ordinate of the graph shown in this figure exhibits a temperature difference (or temperature rise) between the condition that the positional difference (stepped difference) between the semi-cylindrical bearings 10C, 10D was caused at the position Y and the condition that no positional difference was caused. For each test component, two kinds of values of deviation between the abutting parts (or degrees of stepped difference), that is, t=10 μm (left side blank bars) and t=20 μm (right side shaded bars) were tested. The graph shows temperature rises measured in these tests (refer to FIG. 9 as to the deviation values t). It is noted that the numerals attached to the bars indicated in the graph correspond to gradation temperatures on the abscissa.

As understood from FIG. 10, the temperature rise of the bearing which was measured at the position Y is small in the case of the provision of circumferential grooves having a relatively large depth formed on the circumferential end region of the inner surface of the semi-cylindrical bearing, and accordingly, the lubricating condition can be maintained to be satisfactory. Further, in comparison with the comparative example of prior art in which no circumferential grooves having a relatively large depth are formed, the temperature rise of the bearing at the position Y is small even though the circumferential grooves having a relatively large depth is formed on the inner surface of the semi-cylindrical bearing over its entirety, and accordingly, it can be found that the lubricating condition can be maintained to be relatively satisfactory.

TABLE 1

(Test Condition)

| ITEM | SIZE | UNIT |
| --- | --- | --- |
| Shaft Diameter | 53 | mm |
| Bearing Width | 17 | mm |
| Load | 35 | MPa |
| Peripheral Speed | 15 | m/sec |
| Lubricant oil | SAE#20 | — |

TABLE 1-continued (Test Condition)

| ITEM | SIZE | UNIT |
| --- | --- | --- |
| Inlet Temperature | 100 | ° C. |
| Oil supply Pressure | 0.4 | MPa |
| Surface Roughness | 0.8 | Rz(μm) |
| Bearing Clearance | 50 | μm |

TABLE 2

(Specification of Test Specimens)

| Specification | Circumferential Groove | | Surface Roughness of Circumferential Center Region |
| --- | --- | --- | --- |
| | Depth | Pitch | |
| Invention Example 1 | 12 μm | 0.7 mm | Rz 0.9 μm |
| Invention Example 2 | 10 μm | 0.5 mm | Rz 0.9 |
| Invention Example 3 | 12 μm | 0.7 mm | 12 μm |
| Comparative Example | Surface Roughness Rz 0.9 μm | | Rz 0.9 μm |

*Note:
Rz shown in Table 2 denote surface roughness.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A sliding bearing for supporting a crankshaft or a crank pin in an internal combustion engine, comprising:

a first semi-cylindrical bearing half and a second semi-cylindrical bearing half to be combined with each other so as to form a cylindrical bearing, the cylindrical bearing being adapted to be incorporated in a split-type bearing housing composed of a first housing half and a second housing half, the first housing half having a higher stiffness than the second housing half, and the first and the second housing halves being adapted to be combined to provide said housing having a housing bore, the housing bore corresponding to the cylindrical bearing wherein the first bearing half is incorporated in the first housing half and the second bearing half is incorporated in the second housing half, wherein at least the first bearing half is provided with a number of circumferential grooves on an inner surface thereof so as to extend circumferentially along the inner surface thereof, and wherein the circumferential grooves at least in one circumferential end region of the inner surface of the first semi-cylindrical bearing half, have a depth of not less than 10 μm, the circumferential end region including a circumferential bearing end face oriented in a direction opposite to a rotation direction of the crankshaft or the crank-pin, whereby even if a step portion is generated between abutting end faces of the bearing halves at the circumferential end region, the depth of the grooves at the circumferential end region are greater than or equal to a height of the step portion.

2. The sliding bearing according to claim 1, wherein the circumferential end region of the inner surface is defined by a circumferential length range corresponding to a circumferential angle of at least 10°, but 50° at maximum, which is measured from the circumferential end face as a starting point.

3. The sliding bearing according to claim 2, wherein a residual region of the inner surface of the semi-cylindrical bearing other than the region of the circumferential length range has a surface roughness of not more than 3.2 μmRz.

4. The sliding bearing according to claim 1, wherein the circumferential grooves have a pitch of 0.5 to 1.5 mm.

5. The sliding bearing according to claim 1, wherein the bottoms of the circumferential grooves formed on the inner surface of the semi-cylindrical bearing half incorporated in the first housing half having the higher stiffness, and an inner surface of the second semi-cylindrical bearing half incorporated in the other housing half, the inner surface, as a sliding surface, being brought into sliding contact with the crankshaft or the crank pin to be supported, have a positional relationship such that the bottoms of the circumferential grooves and the inner surface of the second semi-cylindrical bearing are aligned with each other at abutting end faces of the first semi-cylindrical bearing half and the second semi-cylindrical bearing half.

6. The sliding bearing according to claim 1, wherein the second semi-cylindrical bearing half incorporated in the second housing half is provided with a number of circumferential grooves on an inner surface thereof so as to extend circumferentially along the inner surface thereof, and
wherein the circumferential grooves, existing at least one circumferential end region of the inner surface of the second semi-cylindrical bearing half, have a depth of not less than 10 μm, the circumferential end region of the semi-cylindrical bearing half including a circumferential bearing end face existing at an opposite side to the rotation direction of the crankshaft or the crankpin.

7. The sliding bearing according to claim 6, wherein the circumferential end region of the inner surface of the second semi-cylindrical bearing half incorporated in the second housing half is defined by a circumferential length range corresponding to a circumferential angle of at least 10°, but 50° at maximum, which is measured from the circumferential end face as a starting point.

8. The sliding bearing according to claim 7, wherein a residual region of the inner surface of the second semi-cylindrical bearing other than the region of the circumferential length range has a surface roughness of not more than 3.2 μmRz.

9. The sliding bearing according to claim 6, wherein the circumferential grooves formed on the inner surface in the second semi-cylindrical bearing half incorporated in the second housing half have a pitch of 0.5 to 1.5 mm.

10. The sliding bearing according to claim 6, wherein the thickness of the second bearing half is greater than that of the first bearing half in the circumferential end regions, so that the inner surface of the first semi-cylindrical bearing half and the inner surface of the second semi-cylindrical bearing behalf are aligned with each other at the abutting end faces.

11. A sliding bearing device in an internal combustion engine, comprising:
a sliding bearing for supporting a crankshaft or a crank pin in the internal combustion engine, the sliding bearing comprising a first semi-cylindrical bearing half and a second semi-cylindrical bearing half to be combined with each other so as to form a cylindrical bearing,
a split-type bearing housing of a first housing half and a second housing half, and having a housing bore, which is bi-split so as to correspond to the cylindrical bearing wherein the first bearing half is incorporated in the first housing half and the second bearing half is incorporated in the second housing half, and containing the pair of semi-cylindrical bearings in the bearing housing bore,
the first housing half having a greater stiffness than the second housing half,
wherein at least the first bearing half is provided with a number of circumferential grooves on an inner surface thereof so as to extend circumferentially along the inner surface thereof, and
wherein the circumferential grooves, at least in one circumferential end region of the inner surface of the semi-cylindrical bearing half, have a depth of not less than 10 μm, the circumferential end region including a circumferential bearing end face oriented in a direction opposite to a rotation direction of the crankshaft or the crankpin.

12. The sliding bearing device according to claim 11, wherein the circumferential end region of the inner surface is defined by a circumferential length range corresponding to a circumferential angle of at least 10°, but 50° at maximum, which is measured from the circumferential end face as a starting point.

13. The sliding bearing device according to claim 12, wherein a residual region of the inner surface of the semi-cylindrical bearing other than the region of the circumferential length range has a surface roughness of not more than 3.2 μmRz.

14. The sliding bearing device according to claim 11, wherein the circumferential grooves have a pitch of 0.5 to 1.5 mm.

15. The sliding bearing device according to claim 11, wherein the bottoms of the circumferential grooves formed on the inner surface of the semi-cylindrical bearing incorporated in the first housing half having the higher stiffness, and an inner surface of the second semi-cylindrical bearing incorporated in the second housing half, the inner surface, as a sliding surface, being brought into sliding contact with the crankshaft or the crank pin to be supported, have a positional relationship such that the bottoms of the circumferential grooves and the inner surface of the second semi-cylindrical bearing are aligned with each other at abutting end faces of the first semi-cylindrical bearing half and the second semi-cylindrical bearing half.

16. The sliding bearing device according to claim 11, wherein the second semi-cylindrical bearing incorporated in the second housing half is provided with a number of circumferential grooves on an inner surface of the other semi-cylindrical bearing so as to extend circumferentially along the inner surface thereof, and
wherein the circumferential grooves at one circumferential end region of the inner surface of the second semi-cylindrical half bearing, have a depth of not less than 10 μm, the circumferential end region of the semi-cylindrical half bearing including a circumferential bearing end face existing at an opposite side to the rotation direction of the crankshaft or the crankpin.

17. The sliding bearing device according to claim 16, wherein the circumferential end region of the inner surface of the second semi-cylindrical bearing half incorporated in the second housing half is defined by a circumferential length range corresponding to a circumferential angle of at least 10°, but 50° at maximum, which is measured from the circumferential end face as a starting point.

18. The sliding bearing device according to claim 17, wherein a residual region of the inner surface of the second semi-cylindrical bearing half other than the region of the circumferential length range has a surface roughness of not more than 3.2 μmRz.

19. The sliding bearing device according to claim 16, wherein the circumferential grooves formed on the inner surface in the second semi-cylindrical bearing half incorporated in the second housing half have a pitch of 0.5 to 1.5 mm.

20. The sliding bearing device according to claim 16, wherein the thickness of the second bearing half is greater than that of the first bearing half in the circumferential end regions, so that the inner surface of the first semi-cylindrical bearing half and the inner surface of the second semi-cylindrical bearing half are aligned with each other at the abutting end faces.

* * * * *